United States Patent
Chinnadurai

(12) 
(10) Patent No.: US 8,935,038 B2
(45) Date of Patent: Jan. 13, 2015

(54) VIBRATION ANALYZER FOR VEHICLE DIAGNOSTICS

(71) Applicant: Service Solutions U.S. LLC, Warren, MI (US)

(72) Inventor: Manokar Chinnadurai, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/840,349

(22) Filed: Mar. 15, 2013

(65) Prior Publication Data

US 2014/0277911 A1  Sep. 18, 2014

(51) Int. Cl.
G01M 7/00 (2006.01)
G01H 9/00 (2006.01)

(52) U.S. Cl.
USPC .............................. 701/31.4; 701/37; 702/185

(58) Field of Classification Search
CPC ........... G01M 7/00; G01M 1/00; G01M 1/06; G01M 1/12; G01M 1/003; F16H 7/00; G06F 17/00; G06F 17/40
USPC ............. 701/31.04, 37, 38; 702/185, 56, 113, 702/183; 73/46.2, 146.3, 514.29; 377/19, 377/23
See application file for complete search history.

(56) References Cited

U.S. PATENT DOCUMENTS

| | | | |
|---|---|---|---|
| 6,392,584 B1* | 5/2002 | Eklund | 341/183 |
| 7,832,281 B2* | 11/2010 | Mian et al. | 73/802 |
| 2002/0078749 A1* | 6/2002 | Tajika et al. | 73/514.34 |
| 2003/0088346 A1 | 5/2003 | Calkins et al. | |
| 2004/0102880 A1* | 5/2004 | Brown | 701/29 |
| 2005/0024195 A1* | 2/2005 | Bai | 340/457 |
| 2008/0000301 A1* | 1/2008 | Davidson | 73/654 |
| 2009/0164219 A1 | 6/2009 | Yeung et al. | |
| 2010/0036620 A1* | 2/2010 | Gross et al. | 702/56 |
| 2011/0003665 A1 | 1/2011 | Burton et al. | |
| 2011/0248846 A1* | 10/2011 | Belov et al. | 340/539.1 |
| 2012/0139833 A1 | 6/2012 | Chuang | |
| 2012/0318056 A1* | 12/2012 | Izumi et al. | 73/146.3 |
| 2013/0211737 A1* | 8/2013 | Batcheller et al. | 702/34 |

FOREIGN PATENT DOCUMENTS

WO   2009068983 A2   6/2009

OTHER PUBLICATIONS

International Search Report mailed Aug. 22, 2014 for PCT/US2014/027962 filed Mar. 14, 2014.

\* cited by examiner

*Primary Examiner* — Tan Q Nguyen
(74) *Attorney, Agent, or Firm* — Baker & Hostetler LLP

(57) ABSTRACT

A vibration analyzer with an integrated sensor and method are provided to sense a vibration in a component of a vehicle. The vibration analyzer includes a three-axis accelerometer, a controller, a connector, a wireless interface and a battery. The vibration analyzer receives vibration data and vehicle data and packages them together and transmits the packaged data to a remove device such as a scan tool. The vibration analyzer can be networked with the remote device or with another vibration analyzer.

16 Claims, 2 Drawing Sheets

VIBRATION ANALYZER FOR VEHICLE DIAGNOSTICS

FIELD OF THE INVENTION

The present invention relates generally to a vibration-sensing device. More particularly, the present invention relates to a vehicle vibration sensor that is incorporated in a vibration analyzer.

BACKGROUND OF THE INVENTION

Modern vehicles include components that are subjected to torsional vibration when the vehicle is driven or while operating. The torsional vibration can cause premature damage to the components or cause unwanted noise in the vehicle. The source of the torsional vibration can be detected with a vibration analyzer.

The conventional vibration analyzer can include an external sensor or multiple sensors located in various parts of the vehicle. The sensor's signal can be received by a channel or multi-channel vibration analyzer. Additionally, conventional vibration sensors do not include a self-contained battery or wireless communication or network capabilities in order to pool various data points. Further, the conventional vibration analyzer requires mounting of the vibration sensor on the plane of measured vibration axis as most of the vibration sensors operate only on one axis plane. Additionally, vehicle parameters that can be obtained from an electronic control unit of a vehicle, such as vehicle speed, engine rotations per minute are also necessary part of the vibration testing or analysis.

Accordingly, it is desirable to provide a vibration analyzer that can be easily deployed and include network connectability.

SUMMARY OF THE INVENTION

The foregoing needs are met, to a great extent, by the present invention, wherein in one aspect a vibration analyzer is provided that in some embodiments includes a vibration analyzer with an integrated vibration sensor.

In accordance with one embodiment of the present invention, a vibration analyzer is provided and includes a connector to connect the vibration analyzer to another device, a three axis accelerometer to detect a vibration of a component, a controller to control a function of the vibration analyzer, the controller communicates with the connector and the three axis accelerometer, and a housing that houses the connector, the three-axis accelerometer and the controller, the housing being formable to a shape similar to a portion of the component.

In accordance with another embodiment of the present invention, a vibration analyzer is provided and includes a connector to connect the vibration analyzer to a remote device, a three axis accelerometer to detect a vibration of a component, a wireless interface configured to allow the vibration sensor to communicate with the remote device, a controller to control a function of the vibration analyzer, the controller communicates with the connector, the three axis accelerometer and the wireless interface, and a housing that houses at least a portion of each of the connector, the three axis accelerometer, the wireless interface and the controller, the housing being formable to a shape similar to a portion of the component.

In accordance with yet another embodiment of the present invention, a method of detecting a vibration of a vehicle component that includes the steps of sensing the vibration of the component with a three axis accelerometer of a vibration analyzer, processing a vibration data with a controller of the vibration analyzer, the controller having a memory containing a software, receiving vehicle data from the vehicle through a connector of the vibration analyzer, packaging the vibration data with the vehicle data, and transmitting wirelessly, with a wireless interface of the vibration analyzer, the packaged vibration data and vehicle data to a remote device.

There has thus been outlined, rather broadly, certain embodiments of the invention in order that the detailed description herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1A:
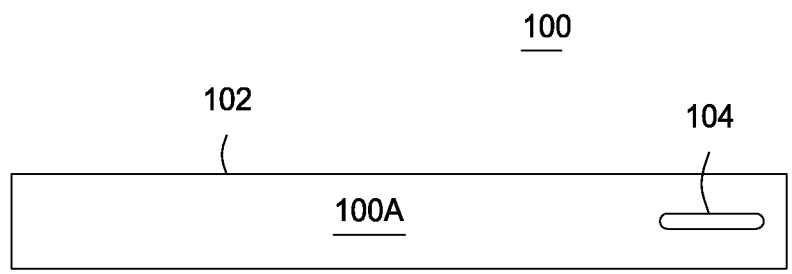
FIGS. 1A-C is side views illustrating vibration analyzers according to various embodiments of the invention.

The invention will now be described with reference to the drawing figures, in which like reference numerals refer to like parts throughout. An embodiment in accordance with the present invention provides an apparatus, such as a vehicle vibration analyzer that includes an accelerometer/vibration sensor, a host interface microcontroller, and a wired and/or wireless connection. The types of vehicle that the vibration analyzer can be used on include automobiles, trains, planes, and ships.

Figure 1B:
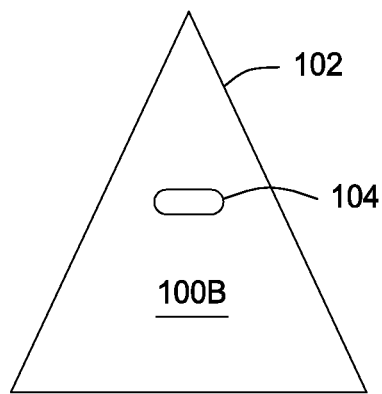
Figure 1C:
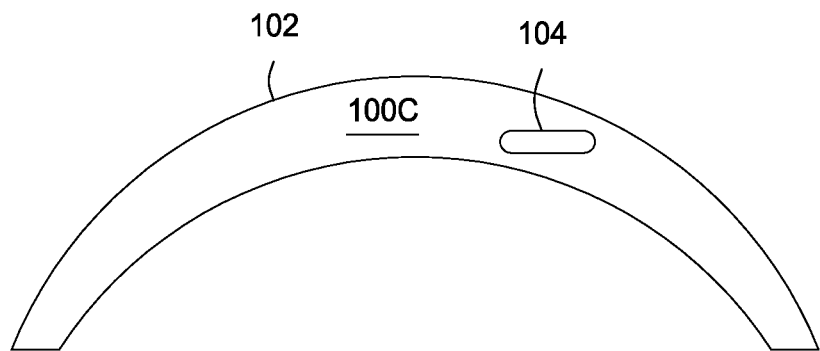

Embodiments of the present inventive apparatuses are illustrated in FIGS. 1A-C. In particular, FIGS. 1A-C are side views illustrating vibration analyzers according to various embodiments of the invention. These various embodiments for vibration analyzers allow the user the flexibility of using the proper (including proper shaped) vibration analyzer based on the shape of the component where the analyzer is placed. In one embodiment, the housing of the vibration analyzer can be made from a shape forming material, such as a polymer, thermoplastic and the like, or be malleable so that the housing can be shaped according to the need of the user. For example, if the vibration analyzer is placed on a rounded surface, such as a conduit, then the vibration analyzer housing can be bent to fit around the conduit. The housing can be configured to not affect the functionality of the internal components of the vibration analyzer, such as having enough space between where the components are located and an external surface of the housing.

FIG. 1A illustrates a side view of a generally rectangular vibration analyzer 100A. A housing 102 can be formed into any shape and in this embodiment, it may be formed into a generally rectangular shape. The general rectangular shaped of the vibration analyzer 100A allows it to be placed on a generally flat surface of a portion of a vehicle. The vibration analyzer 100A is constructed and configured to be heavy or weighted down enough to properly detect vibration of the portion of the vehicle or a component of the vehicle being tested. In another embodiment, the vibration analyzer 100A can be coupled to the portion of the vehicle or the component using adhesives, magnets, straps, Velcro, nonpermanent glue, and the like. The coupling can be permanent or temporary. By being permanent, the particular component can be tested over a long period of time, such as for prototyping purposes.

The vibration analyzer 100A can also include an interface port 104 to interface with various connectors such as USB, FireWire, serial, parallel, RS 232, RS485, OBD (I and II), Ethernet, and the like. Interface port 104 allows for communication between vibration analyzer 100A and another device, such as a computer device. In another embodiment, interface port 104 allows for communication and/or power with the computing device. The communication and/or power can be bi-directional. The computing device can include a diagnostic tool, a remote computer or another vibration analyzer. Other devices may include a storage device, such as a hard drive, USB drive, CD player, DVD player, UMD player or other computer readable medium devices.

FIG. 1B illustrates a side view of a generally triangular vibration analyzer 100B. The housing 102 can be formed into any shape and in this embodiment, it may be formed into a generally triangular shape. The general triangular shaped of the vibration analyzer 100B allows it to be placed on a generally flat surface of a portion of a vehicle or a crevice or hole in the vehicle. Because vibration analyzer 100B includes a pointed end, it may be placed with the pointed end in a crevice or a hole of a portion of the vehicle and thereby, held within the hole during use. The vibration analyzer 100B is also constructed and configured to be heavy or weighted down enough to properly detect vibration of the portion of the vehicle or a component of the vehicle being tested. In another embodiment, the vibration analyzer 100A can be coupled (temporarily or permanently) to the portion of the vehicle or the component using adhesives, straps, magnets, Velcro, nonpermanent glue, and the like.

Like vibration analyzer 100A, the vibration analyzer 100B can also include an interface port 104 to interface with various connectors such as USB, FireWire, serial, parallel, RS 232, RS485, OBD (I and II), Ethernet, and the like. Interface port 104 allows for communication between vibration analyzer 100B and another device, such as a computer device.

FIG. 1C illustrates a side view of a generally half circular vibration analyzer 100C. The housing 102 can be formed into any shape and in this embodiment, it may be formed into a generally half circular shape. The general half circular shaped of the vibration analyzer 100C allows it to be placed on a generally circular surface of a portion of a vehicle, such as a hose, a pipe, a shock and the like. The vibration analyzer 100C is also constructed and configured to be heavy or weighted down enough to properly detect vibration of the portion of the vehicle or a component of the vehicle being tested. In another embodiment, the vibration analyzer 100C can be coupled (temporarily or permanently) to the portion of the vehicle or the component using adhesives, straps, magnets, Velcro, nonpermanent glue, and the like.

The vibration analyzer 100C can also include an interface port 104 to interface with various connectors such as USB, FireWire, serial, parallel, RS 232, RS485, OBD (I and II), Ethernet, and the like. Interface port 104 allows for communication between vibration analyzer 100C and another device, such as a computer device.

In still another embodiment, the vibration analyzer may be configured to partially or totally wrap around any object that it is placed with. By be able to be partially or totally wrapped around the object, the vibration analyzer can be placed on or around any shaped objects including oddly shaped objects so that potentially any vibration in the vehicle can be detected and determined. Additionally, by being able to be partially or totally wrapped around any object, the vibration analyzer can be held in place better than simply being placed on the object.

The housing 102 may also be made from a material that can withstand the harsh environments that it may be placed in, such as a vehicle. The housing can be configured to protect the components of the vibration analyzer 100A-C described herein.

Figure 2:
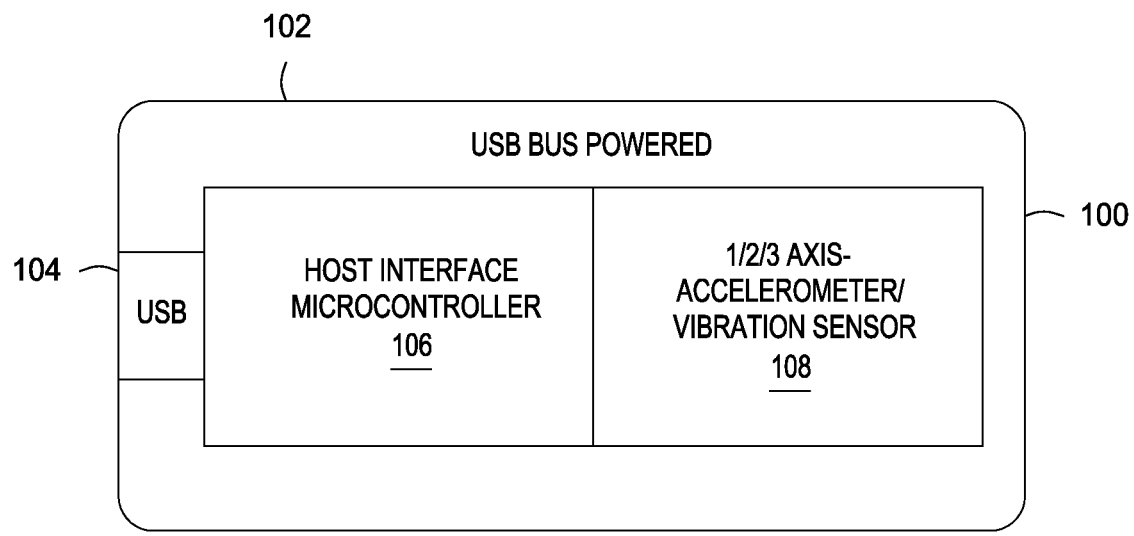
FIG. 2 is a block diagram of the components of the vibration analyzer according to an embodiment of the invention.

FIG. 2 is a block diagram of the components of the vibration analyzer 100A-C according to an embodiment of the invention. The vibration analyzer 100A-C in one embodiment may include the housing 102, the interface port 104 in the form of a USB connector, a host interface microcontroller 106 and a 1/2/3 axis accelerometer/vibration sensor 108.

As previously stated, the housing 102 can be the shaped into any shape desired by the user. The host interface microcontroller 106 can control the operations of the vibration analyzer 100A-C and includes software to operate the vibration analyzer and to communicate with another device, such as a scan tool or a computing device. The host interface microcontroller 106 includes a memory (not shown) to store the software and any data received by the vibration analyzer 100A-C. Further, depending on the type of sensor 108 used, the host interface microcontroller 106 may include an analog to digital converter. The host interface microcontroller 106 can also calculate and format the data received from the sensor and/or the vehicle data from the electronic control unit in the vehicle. The formatted data can then be sent to another device in the format useable for that device.

The 1/2/3 axis accelerometer/vibration sensor 108 allows detection of the vibration in all three axis (x-y-z). The sensor 108 may include a MEMS accelerometer. By detecting in all three axis, the vibration analyzer 100A-C can detect the vibration in any direction and is not necessarily dependent on the correct directional detection placement in order to function properly. That is the vibration analyzer 100A-C does not have to be placed or mounted on the plane of the measured vibration axis. The 1/2/3 axis accelerometer/vibration sensor 108 can communicate with and be controlled by the host interface microcontroller 106.

The interface port 104, in one embodiment, may be a USB port that allows communication with another device. Additionally, the interface port 104 allows for power that is available from another device to power the vibration analyzer 100A-C. The interface port 104 also allows for the vibration analyzer 100A-C to be networked with another device, such as a scan tool, computing device or even another vibration analyzer. Additionally, the interface port 104 allows for another device to program or reprogram the vibration analyzer 100A-C. Some programming may include when to send the measured acceleration data (when above a certain threshold), transmitting frequency (to match receiver frequency), formatting, data analysis, and the like.

Figure 3:
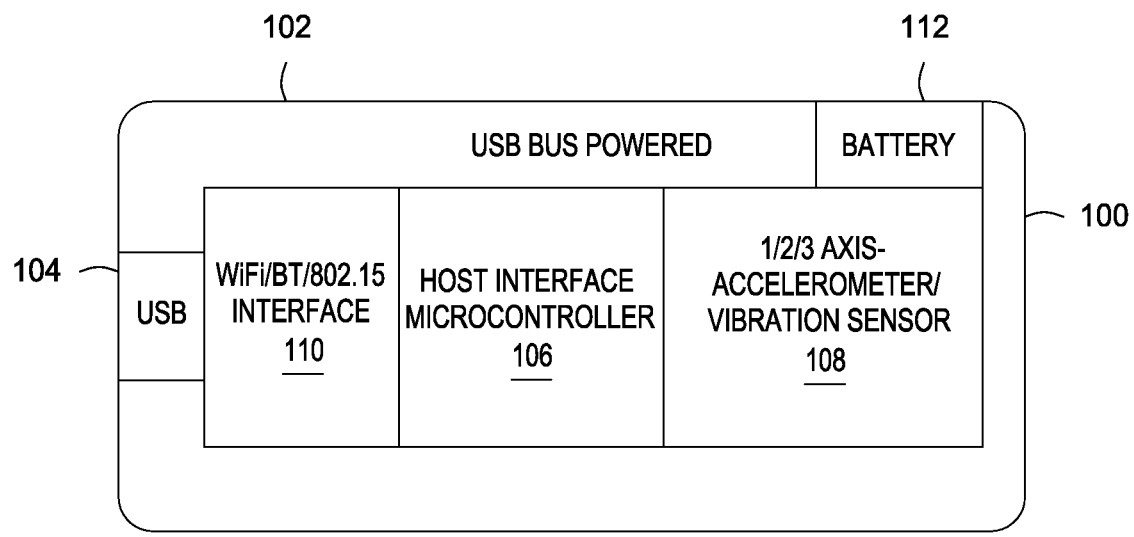
FIG. 3 illustrates a block diagram of the components of the vibration analyzer according to another embodiment of the invention.

FIG. 3 is a block diagram of the components of the vibration analyzer 100A-C according to another embodiment of the invention. The vibration analyzer 100A-C in this embodiment may include the housing 102, the interface port 104 in the form of a USB connector, the host interface microcontroller 106 and a 1/2/3 axis accelerometer/vibration sensor 108, a wireless interface 110 and a battery 112. The components of FIG. 3 are similar to the components of FIG. 2 except for the addition of the wireless interface 110 and battery 112.

The wireless interface 110 allows for wireless communication with another device and allows the vibration analyzer 100A-C to be networked with a computing device or another vibration analyzer. The wireless interface 110 may communicate in various protocols, such as RF (radio frequency), satellites, cellular phones (analog or digital), Bluetooth®, Wi-Fi, 802.15, Infrared, Zigby, near field communication, Local Area Networks (LAN), WLAN (Wireless Local Area Network), or other wireless communication configurations and standards. The wireless interface 110 may be controlled by the host interface microcontroller 106 and provide information (analyzed data) to and from another device. The wireless interface 110 may also receive wirelessly vehicle data from a scan tool or a vehicle communication interface that is coupled to the vehicle OBD (I or II) port. In another embodiment, the wireless interface 110 may also be part of the components of the vibration analyzer 100A-C shown in FIG. 2.

In one embodiment, the vibration analyzer 100A-C may receive vehicle data from the vehicle's ECU (electronic control unit) through the interface port 104 or through the wireless interface 110. The interface port 104 may be any type of connector including a connector for a cable that couples with an OBD (I or II) port in the vehicle. The vehicle data, such as engine rpm or vehicle speed, may be received by the host interface microcontroller 106. The vehicle data may also be packaged with the vibration data received from the 1/2/3 axis accelerometer/vibration sensor 108. The host interface microcontroller 106 can analyzed the vibration data and the vehicle data using conventional analysis software packages and determine the source of the vibration. Additionally, the host interface microcontroller 106 can determine if the vibration meets or surpasses a certain threshold and that it is at a level that requires replacement or repair of the vehicle component. The analyzed data can then be formatted to a format useable by another device and transmitted to another device.

The battery 112 can be used to power the components of vibration analyzer 100A-C. The battery 112 may be Nickel Cadmium, Nickel Metal Hydride, and Lithium Ion, Lithium air, Nickel Hydrogen, and the like. The battery may be integrated or replaceable, or rechargeable, as needed. In one embodiment, the interface port 104 can be used to charge the battery 112 via an external power source. In an alternative embodiment, the battery 112 can be part of the components described in FIG. 2.

The ability to network the vibration analyzer 100A-C with each other and to the scan tool or other computing device allows for the deployment of more than one vibration analyzer 100A-C throughout the vehicle. This allows for faster analysis and quicker location of the vibration. Additionally, the vibration analyzer 100A-C may be programmed to forward to another device only data related to vibration that meets certain threshold characteristics. This decreases the amount of false vibration signals produced during testing and allows for quicker diagnosis.

In another embodiment, self-test of the vibration analyzer 100A-C can occur through the use of the network. Two or more vibration analyzers 100A-C may be placed on the same portion of the vehicle, for example an axle or a pipe, and should provide similar signals to a computing device for independent verification. If the signals are similar (within certain frequency, for example) then the vibration analyzers 100A-C are working properly. If the signals are different from each other (by a predetermined range) then one of the vibration analyzers 100A-C is not functioning properly and may need to be calibrated or fixed. This self-test allows the technician to be confident in the data received from the vibration analyzer 100A-C and confident in his diagnosis.

The embodiments herein include the vibration sensor being integrated in the vibration analyzer. This allows for the sensing and analysis of the vibration data along with the vehicle data in one device.

The many features and advantages of the invention are apparent from the detailed specification, and thus, it is intended by the appended claims to cover all such features and advantages of the invention, which fall within the true spirit, and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vibration analyzer, comprising:
   a connector to network the vibration analyzer to another device;
   a three-axis accelerometer to detect a vibration of a component;
   a controller to control a function of the vibration analyzer, the controller communicates with the connector and the three-axis accelerometer; and
   a housing that houses the connector, the three-axis accelerometer and the controller, the housing being formable to a shape similar to a portion of the component, wherein the vibration analyzer is able to perform a self-test using the networked another device that is a different vibration analyzer.

2. The vibration analyzer of claim 1 further comprising a memory that stores software to perform a vibration detection function, wherein the memory is coupled the controller.

3. The vibration analyzer of claim 1, wherein the connector allows the vibration analyzer to be powered by an external power source.

4. The vibration analyzer of claim 1, wherein the shape is formed so that it is held by the portion of the component under test.

5. The vibration analyzer of claim 1, wherein the connector receives vehicle data from an electronic control unit of the vehicle.

6. The vibration analyzer of claim 5, wherein the vehicle data is packaged with a vibration data and analyzed.

7. A vibration analyzer, comprising:
   a connector to connect the vibration analyzer to a remote device;
   a three-axis accelerometer to detect a vibration of a component;
   a wireless interface configured to allow the vibration analyzer to network with the remote device;

a controller to control a function of the vibration analyzer, the controller communicates with the connector, the three-axis accelerometer and the wireless interface; and a housing that houses at least a portion of each of the connector, the three-axis accelerometer, the wireless interface and the controller, the housing being formable to a shape similar to a portion of the component, wherein the vibration analyzer is able to perform a self-test using the networked remote device that is a different vibration analyzer.

8. The vibration analyzer of claim 7, wherein the connector allows the vibration analyzer to be networked with another device.

9. The vibration analyzer of claim 7 further comprising a memory that stores software to perform a vibration detection function, wherein the memory is coupled the controller.

10. The vibration analyzer of claim 7, wherein the wireless interface receives vehicle data.

11. The vibration analyzer of claim 7 further comprising a battery to power the vibration analyzer.

12. The vibration analyzer of claim 7, wherein the shape is formed so that it is held by the portion of the component.

13. The vibration analyzer of claim 7, wherein the connector receives vehicle data from an electronic control unit of the vehicle.

14. The vibration analyzer of claim 13, wherein the vehicle data is packaged with a vibration data.

15. A method of detecting a vibration of a vehicle component, comprising the steps of:

sensing the vibration of the vehicle component with a three-axis accelerometer of a vibration analyzer;

processing a vibration data with a controller of the vibration analyzer, the controller having a memory containing software;

receiving vehicle data from the vehicle through a connector of the vibration analyzer;

packaging the vibration data with the vehicle data;

transmitting wirelessly, with a wireless interface of the vibration analyzer, the packaged vibration data and vehicle data to a networked remote device; and performing a self-test with the networked remote device that is a different vibration analyzer through the wireless interface.

16. The method of claim 15 further comprising the step of;

shaping a housing of the vibration analyzer to fit on a surface of the vehicle component.

* * * * *